Sept. 13, 1938.   O. E. SARGENT ET AL   2,129,968
MEANS AND METHOD OF PROCESSING FOWL
Filed Feb. 2, 1937    2 Sheets-Sheet 1

INVENTORS,
OTTO ELMER SARGENT.
JAMES RAYMOND PICHININO.
BY
Lippincott & Metcalf
ATTORNEYS.

Sept. 13, 1938.  O. E. SARGENT ET AL  2,129,968
MEANS AND METHOD OF PROCESSING FOWL
Filed Feb. 2, 1937  2 Sheets-Sheet 2
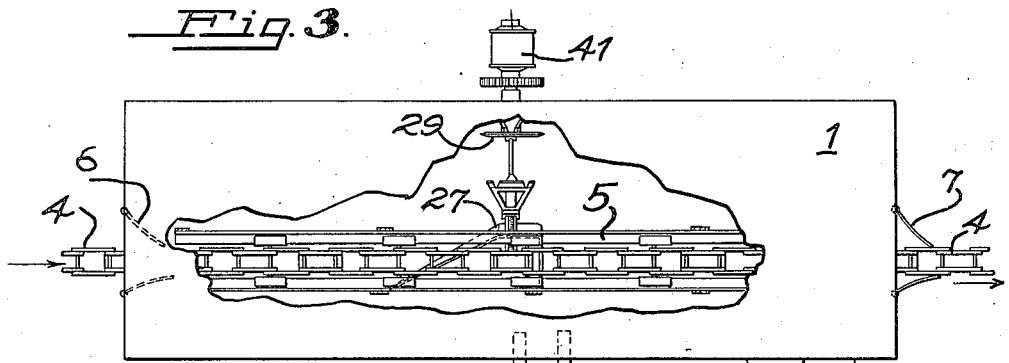
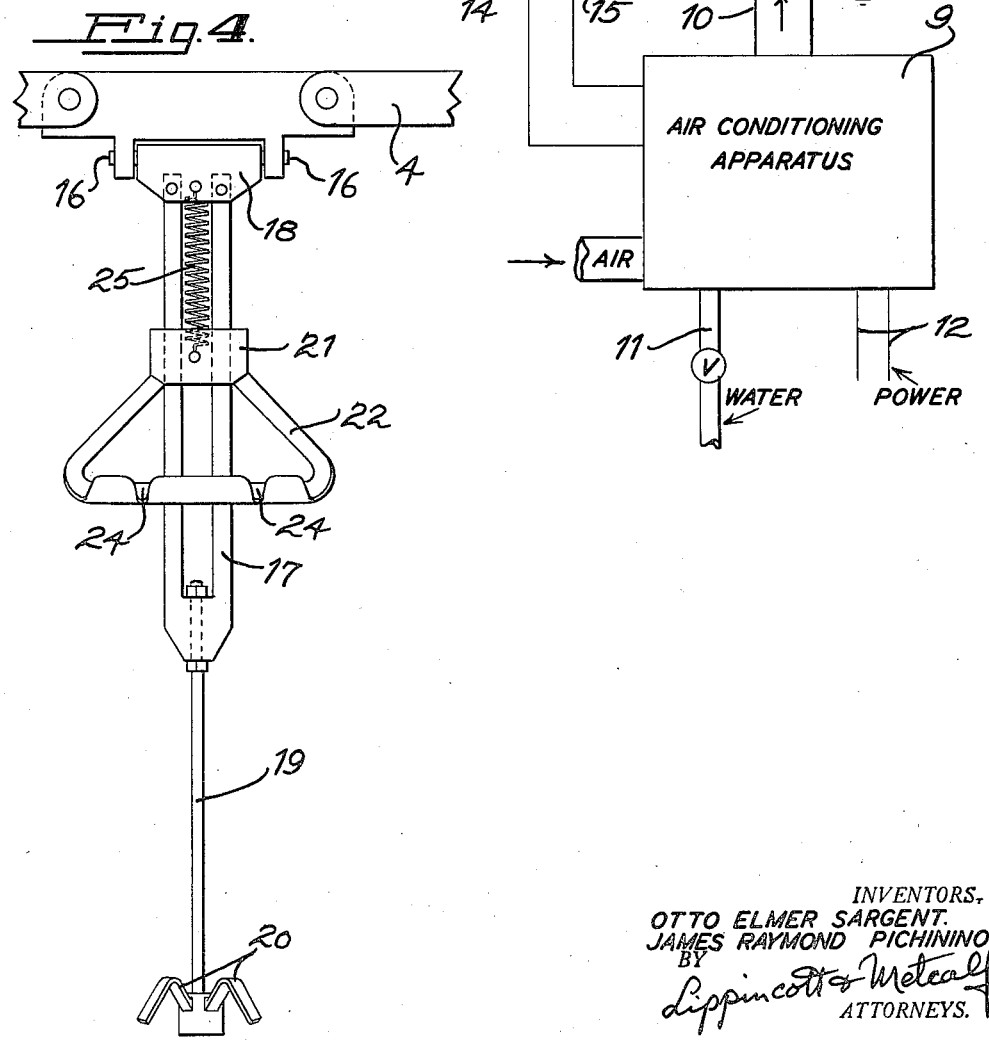
INVENTORS,
OTTO ELMER SARGENT.
JAMES RAYMOND PICHININO.
BY
Lippincott & Metcalf
ATTORNEYS.

Patented Sept. 13, 1938

2,129,968

UNITED STATES PATENT OFFICE 2,129,968

MEANS AND METHOD OF PROCESSING FOWL

Otto Elmer Sargent and James Raymond Pichinino, San Francisco, Calif.

Application February 2, 1937, Serial No. 123,576

11 Claims. (Cl. 17—11)

Our invention relates to a method of processing fowl, and to one particular apparatus embodiment for practicing the method. The means and method of our invention are ideally adapted for the killing and bleeding of fowl, prior to picking the feathers therefrom and to preparing the fowl for the picking process.

While our invention is equally applicable to various kinds of fowl, it will be described herein with respect to the process of chickens.

Among the objects of our invention are:

To provide an improved method of killing and bleeding fowl; to provide a means and method for rapidly emptying a fowl of blood; to provide a means and method for continuously processing fowl; to provide a means and method for preparing a fowl for picking during the time it is being killed and bled; and to provide an improved fowl processing means and method.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Referring to the drawings:

Figure 3 is a diagrammatic view of the processing housing and carrier belt.

Figure 4 is a plan view of a chicken holder mounted on the carrier belt.

Figure 1:
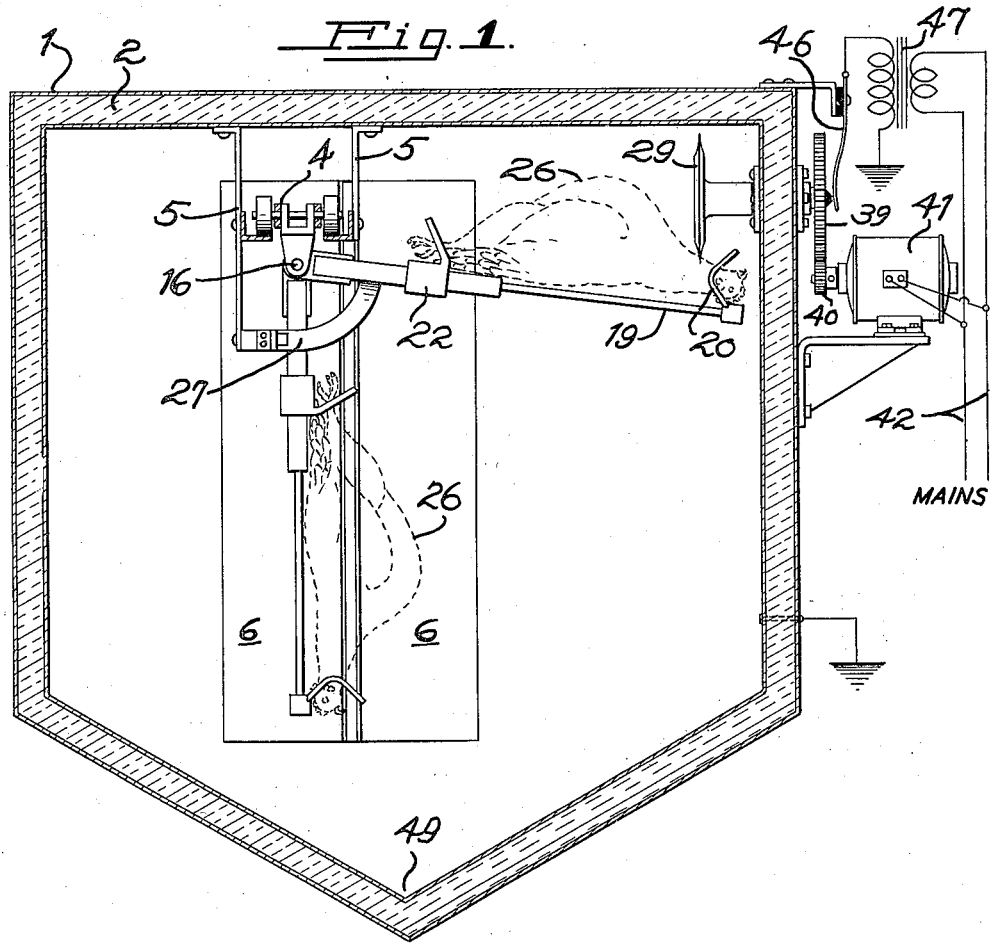
Figure 1 is a cross sectional view partly in elevation and including a circuit diagram, of one preferred form of fowl processing apparatus embodying our invention.

In processing fowl for the market, three primary steps must be taken, although not necessarily in the order named. First, killing; second, bleeding; and third, picking the feathers from the bird. A number of prior art machines have been developed for this purpose, and many of them depend upon the use of steam jets for projecting moisture and heat underneath the feathers of the fowl, in combination with various other means for killing and bleeding the fowl. It has also been suggested heretofore that electrocution be performed on the bird in order to stun or kill it before the cutting step, the cutting step taking place sometime after the bird has been electrocuted. We have found, however, that it is not necessary for the bird to have live steam applied to it, and we substitute instead a sweating process whereby the bird is maintained at a relatively low temperature but in an atmosphere of relatively high humidity. In this manner the bird may be subjected to the sweating process while it is still alive and mounted on the carrier, without causing the bird any suffering and it may be electrocuted and cut simultaneously in order that the contraction of the muscles caused by the electrocution may aid in the discharge of blood. This aid in the discharge of the blood is a great advantage, in that it is well known in the art that thorough bleeding is greatly to be desired.

In furtherance of our discovery in this regard, we have found that it is desirable to apply the electrocution current directly through the cutting knife, thus doing away with the need of automatic switches, or other devices, to time the cutting current in accordance with the position of the chicken on the carrier.

Other advantages of our invention may be more fully understood by direct reference to the drawings, which show one preferred embodiment of a continuous processing apparatus employing our improved method.

A housing 1 is provided, preferably double-walled, with insulation 2 therebetween, in order to conserve heat. A carrier belt 4 runs directly through this housing, mounted on suitable carrier supports 5, and driven in any convenient manner. The inlet of the housing is provided with inlet flaps 6 and the outlet with outlet flaps 7, to allow the passage of birds and carrier belt without too great a loss of interior atmosphere.

An air-conditioning apparatus or similar device 9 is connected to the housing through a duct 10 and supplies the interior of the housing with air, preferably at 120° F., and with high humidity, the water being supplied from water mains 11, and the air-conditioning apparatus being provided with heat and power through electric mains 12. The air-conditioning apparatus is controlled, preferably, by a temperature control 14 and a humidity control 15, these latter two controls being mounted within the housing. We have shown the air-conditioning apparatus in diagrammatic form only, as it is obvious that there are many different types of systems which can satisfactorily supply the interior of the housing with warm, humidified air within the limits stated, and even water-evaporating pans in the bottom of the housing, together with means to heat the pans, have been found to be sufficient to maintain the temperature and humidity properly.

The carrier belt 4 is provided at regular intervals with a fowl holder mounted on the carrier belt by hinge pins 16, so that the fowl holder as a whole may swing laterally as it passes through the housing. The holder itself comprises a U-shaped frame 17 mounted on a base plate 18 to which the hinge pins are attached, the bend of the U carrying a single extension 19 terminating in a fork 20, shaped to hold the head of a fowl.

Mounted on the U-frame 17 is a foot holder 21 comprising a triangular frame 22, the base of which is turned up and provided with notches 24 to engage the feet of the fowl. The foot holder 21 moves freely on the U-frame 17 and is drawn toward the base of the holder by a spring 25. In mounting the fowl in the holder, a leg is placed in each notch 24 and the head is placed in the head fork 20, the spring 25 stretching the fowl along the holder as shown by dotted lines 26 in Figure 1. By the use of the spring 25, fowl of varying lengths may be accommodated in the same holder, the holder being thus automatically adjusting.

Means, not shown, of any convenient type are provided for continuously moving the carrier belt through the housing in the direction indicated in Figure 3. Before the individual holders enter the housing a fowl is placed thereon, and as the carrier belt passes through the housing the fowl is carried along on the holders until the holder engages a cam 27 positioned in the path of the holders, and is swung laterally into a nearly horizontal position.

Figure 2:
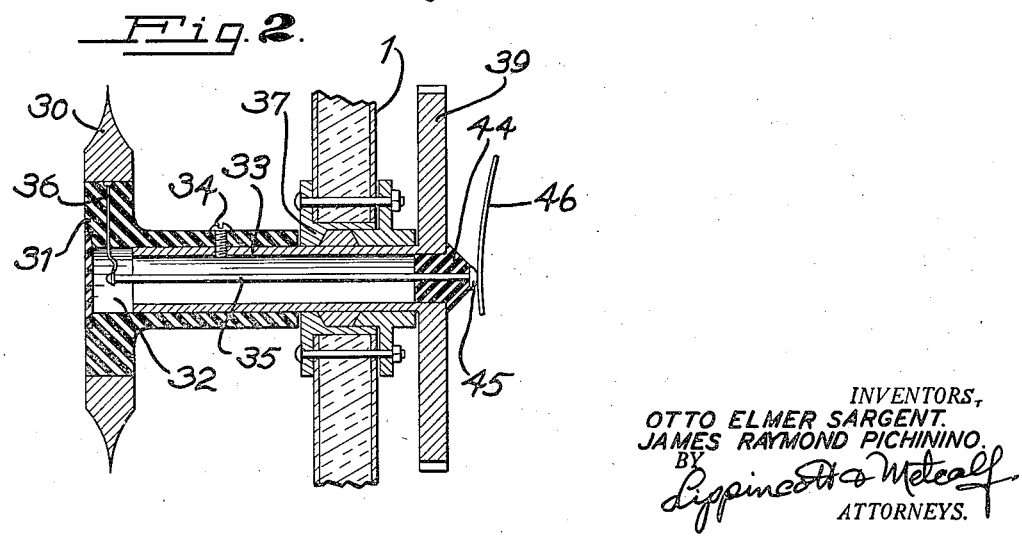
Figure 2 is a sectional view of the killing and cutting knife.

Immediately above the highest point reached by the holder, due to the cam action, is positioned a cutting wheel 29. This cutting wheel is shown in detail in Figures 1 and 2. The cutting wheel itself comprises a peripheral metal cutting portion 30 ground to a sharp edge and mounted on an insulating core 31. This core is provided with an interior aperture 32 and is fixed to a hollow axle 33 by a lock screw 34. A contact rod 35 extends through the hollow axle, and a connecting link 36 connects the outer end of the contact rod with the cutting portion of the wheel. The wheel axle is mounted in a bearing 37 fixed to the wall of the housing 1, and the axle is driven through an axle gear 39 and a motor gear 40, the latter being mounted on a motor 41 supplied from electrical mains 42. The contact rod 35 is mounted in the center of the axle gear 39 by an insulating plug 44, and terminates in an end contact 45 against which a brush 46 presses. The brush 46 is supplied with electrical energy from a transformer 47, energized by mains 42, and both one end of the transformer and the housing are grounded.

The transformer 47 may be a self-regulating transformer which takes very little current through the primary when the secondary is open-circuited, but which will deliver power when the secondary is short-circuited.

Obviously, however, other means for energizing the cutting wheel 29 with electrical current may be utilized, as would be well known in the art. In any case, we do not contemplate the use of any synchronizing switches, inasmuch as the circuit is not completed through the wheel except when the flesh of the fowl contacts it. In this regard the cam 27 is so arranged that it will swing the neck of the fowl in a position where, as the holders pass along the cam, the neck of the fowl will be cut by the rotating wheel. The instant the cutting wheel enters the flesh of the fowl, electrical connection is made through the fowl to the secondary of the transformer 47, thus delivering to the fowl an instantaneous and stunning electrical shock. However, as the cutting proceeds, the main blood vessels in the neck are opened and the first convulsive contraction of the muscles of fowl, due to the shock, causes the instant expulsion of blood from the body of the fowl.

Immediately the cutting is over the cam allows the fowl to fall to the vertical position again, so that the greater portion of the bleeding takes place with the blood falling to the bottom of the housing. In this respect we prefer to form the bottom of the housing with a channel 49 through which the blood may be allowed to run and be removed. The sudden contraction of the muscles during the cutting of the fowl not only greatly aids the expulsion of the blood, but also tends to empty the stomach and crop of the fowl at the same time. It is also to be noted that the instant the cam allows the fowl to fall away from the cutting wheel 29, the secondary of the transformer 47 is again open-circuited, and no current will flow until the next fowl is presented beneath the cutting wheel.

As soon as the bleeding is over the fowl passes out of the exit of the housing and is ready for picking, because during the entire time that it is within the housing it is being subjected to the gentle heat maintained therein and to the excessively high humidity, and we have found that a relatively short exposure to such heat and humidity is sufficient to prepare the feathers and skin of the fowl so that picking may be rapidly and efficiently done after it leaves the housing. We have found that it is not necessary to create air currents within the housing, to utilize jets, or to rotate the fowl during the passage through the housing. The sweating process has been found to be quite sufficient for the preparation of the fowl for picking.

We also wish it to be distinctly understood that while we prefer to mount our cutting wheel in a plane parallel to the plane of motion of the fowl as it passes through the housing, that we do not wish, in any way, to be limited to this particular location of the cutting wheel. The cutting wheel may obviously be mounted in the direct path of the fowl as they pass through in a vertical position. However, in this latter position we have found that the cutting wheel tends to be contaminated with blood as it leaves the fowl, whereas, positioned at the side of the carrier and utilizing the cam 27 to swing the fowl into cutting position, and immediately after cutting to allow the fowl to again return to the horizontal position, keeps the knife in a position sufficiently free from contamination that a large number of fowl may be processed without necessitating frequent shutdowns due to the gumming up of the knife from dried blood.

It will therefore be seen that we have provided a relatively simple apparatus for carrying out our method wherein the fowl is simultaneously cut and stunned by an electric shock, and that we have succeeded in reducing the time necessary for processing the fowl because we can subject the fowl, during its passage through the housing, to a relatively low temperature and high humidity to prepare it for picking, this temperature and humidity being not sufficient to cause cruelty to the live chicken as it passes into the housing.

We claim:

1. A method of processing fowl which comprises cutting the throat of the fowl, and passing an electric current into the fowl during the cutting operation at the cut.

2. A method of processing fowl with a rotary knife which comprises applying the knife while rotating to the throat of the fowl to cut a large blood vessel, and energizing said knife with a stunning charge of electricity during the cutting step.

3. A method of processing fowl with a rotary knife which comprises making electrical contact with the head and foot of the fowl, applying said rotary knife to the throat of said fowl intermediate said contact to produce a rapidly bleeding cut, and applying a stunning potential between said knife and said contacts during the cutting step.

4. The method of continuously processing fowl which comprises making electrical contact with each of the fowl to be processed, serially moving said fowl past a conductive rotating edge to cut the throat of each fowl, and electrically charging said edge to stun the fowl as they are cut.

5. The method of continuously processing fowl which comprises making electrical contact with each of the fowl to be processed, serially moving said fowl past a conductive rotating edge to cut the throat of each fowl, electrically charging said edge to stun the fowl as they are cut, and maintaining said charge between cuts whereby synchronized switching is avoided.

6. The method of continuously processing fowl which comprises making electrical contact with each of the fowl to be processed, serially moving said fowl along a predetermined path positioning a conducting rotary cutting edge in the path of the throats of said fowl to produce a cut upon contact therewith, and maintaining said edge at a stunning potential whereby current will pass between said contact and said edge during the cutting step and the circuit will be opened after the cutting step is completed.

7. Fowl processing means comprising a conveyor, a housing around a portion of said conveyor, carriers mounted on said conveyor and gripping head and feet of said fowl, a rotating conductive knife in said housing, a source of electricity connecting said carrier and said knife, and means for serially moving said fowl past said knife to contact said knife to make a cut, and complete the electrical circuit.

8. Fowl processing means comprising a conveyor, a housing around a portion of said conveyor, carriers mounted on said conveyor and gripping head and feet of said fowl with the head downward, a rotating conductive knife in said housing, a source of electricity connecting said carrier and said knife, means for serially moving said fowl past said knife, and means for moving said moving fowl into cutting contact with said knife, and thereby bleed and electrocute said fowl.

9. Fowl processing means comprising a conveyor, a housing around a portion of said conveyor, carriers mounted on said conveyor and gripping head and feet of said fowl in a vertical position with the head downward, a vertical rotating conductive knife driven by an axle extending laterally into said knife, said knife being in a plane parallel to the plane of motion of said fowl, means for moving said fowl past the knife position, means for swinging said fowl into a horizontal position under said knife to produce a cut thereby during passage, and means for returning said fowl to a vertical position with the head downward to bleed.

10. Fowl processing means comprising a conveyor, a housing around a portion of said conveyor, carriers mounted on said conveyor and gripping head and feet of said fowl in a vertical position with the head downward, a vertical rotating conductive knife driven by an axle extending laterally into said knife, said knife being in a plane parallel to the plane of motion of said fowl, means for moving said fowl past the knife position and means for swinging said fowl into a horizontal position under said knife to produce a cut thereby during passage, means for returning said fowl to a vertical position with the head downward to bleed, and means for applying an electric shock to said fowl during the cutting thereof.

11. Fowl processing means comprising a conveyor, a housing around a portion of said conveyor, carriers mounted on said conveyor and gripping head and feet of said fowl in a vertical position with the head downward, a vertical rotating conductive knife driven by an axle extending laterally into said knife, said knife being in a plane parallel to the plane of motion of said fowl, means for moving said fowl past the knife position and means for swinging said fowl into a horizontal position under said knife to produce a cut thereby during passage, means for returning said fowl to a vertical position with the head downward to bleed, and means for electrifying said knife to apply a stunning shock to said fowl during the cutting thereof.

OTTO ELMER SARGENT.
JAMES RAYMOND PICHININO.